United States Patent [19]

Uenishi et al.

[11] Patent Number: 5,022,738
[45] Date of Patent: Jun. 11, 1991

[54] OPTICAL FIBER NONLINEAR WAVELENGTH MODULATOR DEVICE

[75] Inventors: Naota Uenishi; Takafumi Uemiya; Akira Mizoguchi; Yasuji Ogaki; Yasuhiro Hattori, all of Osaka; Teruo Tohma, Saitama; Kiyofumi Chikuma, Saitama; Sota Okamoto, Saitama, all of Japan

[73] Assignees: Sumitomo Electric Industries, Ltd., Osaka; Pioneer Electronic Corporation, Tokyo, both of Japan

[21] Appl. No.: 588,615

[22] Filed: Sep. 26, 1990

[30] Foreign Application Priority Data

Sep. 26, 1989 [JP] Japan .................................. 1-250923

[51] Int. Cl.⁵ .......................... G02B 6/00; H03F 7/00; F21V 9/00
[52] U.S. Cl. ............................. 350/96.34; 350/96.29; 350/96.30; 307/427; 307/425; 307/430; 252/582
[58] Field of Search ............... 350/96.10, 96.11, 96.12, 350/96.15, 96.29, 96.30, 96.34, 96.13; 307/425, 427, 428, 430; 252/582, 586, 589

[56] References Cited

U.S. PATENT DOCUMENTS

| | | | |
|---|---|---|---|
| 4,382,660 | 5/1983 | Pratt, Jr. et al. | 350/96.14 X |
| 4,874,221 | 10/1989 | Ohsawa | 350/96.29 |
| 4,892,375 | 1/1990 | Chikuma et al. | 350/96.18 |
| 4,893,888 | 1/1990 | Okazaki et al. | 350/96.12 |
| 4,909,587 | 3/1990 | Okamoto et al. | 350/96.19 |
| 4,919,511 | 4/1990 | Ohsawa | 350/96.29 |
| 4,923,277 | 5/1990 | Okazaki et al. | 350/96.29 |
| 4,925,263 | 5/1990 | Sanford et al. | 350/96.12 |
| 4,962,993 | 10/1990 | Okamoto et al. | 350/96.29 |
| 4,981,337 | 1/1991 | Okamoto et al. | 350/96.29 |

Primary Examiner—Brian Healy
Attorney, Agent, or Firm—Cushman, Darby & Cushman

[57] ABSTRACT

A fiber wavelength modulator device which emits a secondary harmonic component by Cerenkov radiation, including a core being a single crystal of a non-linear optical material and a cladding being composed of glass, wherein the relative difference between the core and the cladding has a refraction index with respect to an incident beam, of at lesat 0.015.

4 Claims, 2 Drawing Sheets

OPTICAL FIBER NONLINEAR WAVELENGTH MODULATOR DEVICE

BACKGROUND AND SUMMARY OF THE INVENTION

The present invention relates to a wavelength modulator, and more particularly, it relates to a wavelength modulator which modulates a laser beam to a second harmonic component at high efficiency.

A fiber wavelength modulator device as illustrated in FIG. 5 B has gained popularity in practical use. It comprises a core [10] of an organic non-linear optical crystal having a secondary non-linear optical effect and a cladding [11] of a glass showing no secondary non-linear optical effect. In such a fiber wavelength modulator device, Cerenkov radiation is generated so that a secondary harmonic component is radiated from the core [10] to the cladding [11] making an angle Θ, provided that this Θ satisfies the following equation:

$$\cos \Theta = n_{eff}(\omega)/N(2\omega) \quad (1)$$

where, $n_{eff}(\omega)$ represents the effective refractive index of core [10] with respect to the fundamental wave; and N (2ω) represents the refractive index of the cladding [11] with respect to the secondary harmonic component. In such a case, the emitted secondary harmonic component gives a ring pattern [14] as shown in FIG. 5. In FIG. 5, the fundamental wave is shown by arrow [13].

Conventionally, a glass cladding [11] was employed having a relative difference between the core [10] and the cladding [11] in the refraction index with respect to the fundamental wave of 0.010 or less. Here, the relative difference between the core and the cladding in refractive index above is defined by the following equation $$(n(\omega) - N(\omega))/n(\omega) \quad (2)$$

wherein, n(ω) represents the refractive index of the core [10] with respect to the fundamental wave; and N(ω) represents the refractive index of the cladding [11] with respect to the fundamental wave. Further, the diameter, a, of the core [10] is specified so as to satisfy the following equation $$a < 2.405\lambda/\pi\sqrt{n(\omega)^2 - N(\omega)^2} \quad (3)$$

wherein, λ represents the wavelength of the fundamental wave.

Thus, by transmitting the fundamental wave in its single mode through the core [10] set up as above, it is possible to improve the efficiency of modulating the fundamental wave to the second harmonic component (hereinafter referred to as 'modulation efficiency'), and also to obtain a sharp single ring [14] as the output pattern of the second harmonic component.

In a setup comprising a single crystal of 4-(N,N-dimethylamino)-3-acetamidonitrobenzene (DAN) as the core [10], for example, the DAN single crystal is arranged in the cladding [11] in such a manner that the dielectric principal axes X, Y, and Z may be oriented along specific directions as illustrated in FIG. 6. When an incident beam polarized along the c-direction enters the core [10] above, a secondary harmonic component polarized along the Y-axis direction is emitted. In this case, the refractive index of the core [10] along the c-direction is 1.738 with respect to a light of 1064 nm in wavelength.

If an SF4 glass having a refractive index of 1.726 with respect to a light 1064 nm in wavelength is used in combination as the cladding with the crystal mentioned above, the resulting fiber wavelength modulator device B is one having a relative difference between the core and the cladding in refraction index of 0.0069. Thus, when a laser beam 1064 nm in wavelength polarized along the c-direction emitted from an Nd:YAG laser at the output power of 100 mW enters the core [10] of the aforesaid wavelength modulator device B, a second harmonic component 1.4 μW in output is obtained.

The intensity of the modulated beam which is emitted from the fiber modulator device B is linearly related to the second power of the power density, Pω/a (where, Pω represents the power of the fundamental wave, and a represents the diameter of core [10]), of the fundamental wave in the core [10]. Accordingly, there is proposed to reduce the core diameter, a, to a range of from 1 to 3 μm and thereby improve the modulation efficiency by increasing the power density, Pω/a.

When the diameter, a, of the core [10] is reduced, however, the power, Pω, of the fundamental wave inside the core [10] also decreases, and this reversely works in improving the modulation efficiency.

An object of the present invention is therefore, to provide a wavelength modulator device which emits a second harmonic component from a fundamental wave at high efficiency.

BRIEF DESCRIPTION OF THE DRAWINGS

Further objects and advantages of the present invention will be better understood by carefully reading the following detailed description of the presently preferred exemplary embodiments of this invention in conjunction with the accompanying drawings, in which.

DETAILED DESCRIPTION OF THE INVENTION

The wavelength modulator device according to the present invention which solves the aforementioned problems comprises a core and a cladding having a relative difference in refraction index with respect to the fundamental wave of 0.015 or more, wherein the relative difference in refraction index above is defined by equation (2) below, $$(n(\omega) - N(\omega))/n(\omega) \quad (2).$$

That is, the present inventors, after extensively conducting studies on the refractive indices of the core and the cladding of a fiber wavelength modulator device as well as on the intensity of the modulated beam, have found that, by controlling the relative difference between the core and the cladding in refraction index to 0.015 or more, it is possible to maintain the power of the fundamental wave confined in the core at a constant even if the core diameter is reduced. The present invention is principally based on those findings.

The relative difference between the core and the cladding in refraction index is set at 0.015 or more here, since a difference of less than 0.015 results in too reduced a power, $P\omega$, when the core diameter, a, is decreased, and thereby it becomes impossible to achieve high power density, $P\omega/a$.

Figure 1:
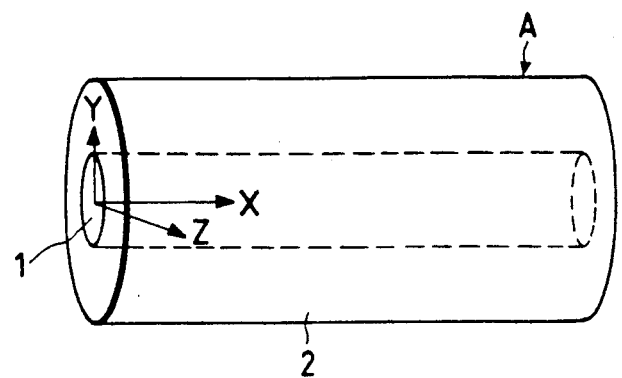
FIG. 1 is an oblique view of a wavelength modulator device according to one embodiment, A, of the present invention.

FIG. 1 is an oblique view of a wavelength modulator device according to an embodiment, "A", of the present invention. The device "A" comprises a single crystal of 3,5-dimethyl-1-(4-nitrophenyl)pyrazol (PRA) as the core [1], and SF4 glass for the cladding [2].

The single crystal PRA, as disclosed in EP(OLS) 0,307,896, comprises dielectric principal axes Y and Z in the cross sectional plane of the device. When a fundamental wave polarized in the Y-axis direction is introduced, the crystal emits a modulated wave polarized along the Z-axis direction. Since the refractive index with respect to an incident beam 820 nm in wavelength of the single crystal PRA along its Y-axis direction is 1.780, and that of the SF4 glass is 1.736 under the same incident beam, the relative difference in refraction index between the core [1] and the cladding [2] of the wavelength modulator device results in a value of 0.025.

There is no particular restriction in the organic nonlinear optical material for use in the present invention, and various types of materials can be employed, such as 3,5-dimethyl-1-(4-nitrophenyl)pyrazole, 4,5-dimethyl-1,3-dithiol-2ylidenecyanoacetate, 3-(2-cyano-2-ethoxycarbonylvinyl)indole, 2-methyl-4-nitroaniline, 4-(N,N-dimethylamino)-3-acetamidonitrobenzene, 4'-nitrobenzylidene-3-acetamino-4-methoxyaniline, a molecular salt comprising 4-(4'-hydroxystyryl)-1-methylpyridium as the cation and 4-toluenesulfonate as the anion, a molecular salt comprising 4(4'-chlorostyryl)-1-methylpyridium as the cation and 4-toluenesulfonate as the anion, 4-bromo-4'-methoxycalcon, 3-nitro-5-(N,N-dimethylamino)-acetanilide, 3-nitro-5-(N,N-dimethylamino)-aniline, N-(4'-methoxybenzoyl)-4-cyanoaniline, N-methyl-N-(4-cyanophenyl)aminoacetonitrile, 4-nitrobenzylidene-2,3-dimethylaniline, 4-nitrobenzylidene-2,4-dimethylaniline, 4-nitrobenzylidene-2,5-dimethylaniline, 4-nitrobenzylidene-3,4-dimethylaniline, 4-nitrobenzylidene-3,5-dimethylaniline, 4-nitrobenzylidene-2,4-dimethoxyaniline, 4-nitrobenzylidene-3,4,5-trimethoxyaniline, 3-nitrobenzylidene-3,4,5-trimethoxyaniline, 2-nitrobenzylidene-3,4,5-trimethoxyaniline, 3-nitrobenzylidene-2,3-dimethylaniline, 3-nitrobenzylidene-2,5-dimethylaniline, 3-nitrobenzylidene-3,5-dimethylaniline, 4,5-dimethyl-1,3-dithiol-2ylidenecyanoacetate, 1,3-dithiol-2-ylidenecyanoacetate, N-(4-nitrophenyl)-(S)-prolinol (NPP), N-(5-nitro-2-pyridyl)-(S)phenylacrinol (NPPA), and 9-methylcarbazole-3-carboxaldehyde. Most preferred among them are 3,5-dimethyl-1-(4-nitrophenyl)pyrazole, 4,5-dimethyl-1,3-dithiol-2-ylidenecyanoacetate, 3-(2-cyano-2-ethoxycarbonylvinyl)indole, 2-methyl-4-nitroaniline, 4-(N,N-dimethylamino)-3-acetamidonitrobenzene, 4'-nitrobenzylidene-3-acetamino-4-methoxyaniline, a molecular salt comprising 4-(4'-hydroxystyryl)-1-methylpyridium as the cation and 4-toluenesulfonate as the anion, a molecular salt comprising 4-(4'-chlorostyryl)-1-methylpyridium as the cation and 4-toluenesulfonate as the anion, and 4-bromo-4'-methoxycalcon.

EXAMPLES

The invention is demonstrated with reference to the following examples, which are of an illustrative nature only and which are to be construed as non-limiting.

EXAMPLE 1

An end of an SF4 glass capillary tube (about 1 mm in outer diameter and 1.6 μm in inner diameter; the glass having a refractive index with respect to a beam 820 nm in wavelength of 1.736) was immersed into a melt of 3,5-dimethyl-1-(4-nitrophenyl)pyrazole (PRA; having a m.p. of 100° C.) maintained at 105° C. After the PRA melt was sufficiently sucked up into the tube by the capillary action, the tube was rapidly cooled to obtain polycrystalline precipitates of PRA inside the tube. The polycrystals were remelted by charging the tube into a heating furnace maintained at 105° C., and the tube was drawn out from one end of the heating furnace at the rate of 1 mm/hour to obtain a single crystal PRA grown inside the tube to about 50 mm in length. From this tube, containing therein, the grown single crystal, PRA was cut into a portion 5 mm in length, to obtain a fiber wavelength modulator.

EXAMPLE 2

The same capillary tube as used in Example 1 was charged in a heating furnace maintained at 80° C., and inside this tube was injected an acetonitrile solution comprising 0.6 g/ml of PRA. The tube was then drawn out from the heating furnace at the rate of 0.5 mm/hour, to obtain single crystal PRA inside the tube taking advantage of the fact that PRA reduces solubility with decreasing temperature. The same procedure of Example 1 was then repeated to obtain a fiber wavelength modulator device.

EXAMPLE 3

The same procedure described in Example 1 above was repeated to obtain single crystal PRA, except for using a SF14 glass capillary tube (about 1 mm in outer diameter and 1.7 μm in inner diameter; the glass having a refractive index with respect to a beam 820 nm in wavelength of 1.741). Subsequently, a fiber wavelength modulator device was obtained in the same manner as in Example 1.

EXAMPLE 4

The same procedure described in Example 2 was applied to a capillary tube used in Example 3 to obtain single crystal PRA inside the tube. Subsequently, a fiber wavelength modulator device was obtained in the same manner as in Example 1.

EXAMPLE 5

The same procedure described in Example 1 above was repeated to obtain single crystal PRA, except for using an SF3 glass capillary tube (about 1 mm in outer diameter and 1.4 μm in inner diameter; the glass having a refractive index with respect to a beam 820 nm in wavelength of 1.721). Subsequently, a fiber wavelength modulator device was obtained in the same manner as in Example 1.

EXAMPLE 6

The same procedure described in Example 2 was applied to a capillary tube used in Example 5 to obtain single crystal PRA inside the tube. Subsequently, a fiber wavelength modulator device was obtained in the same manner as in Example 1.

EXAMPLE 7

The same procedure described in Example 1 above was repeated to obtain single crystal PRA, except for using an SF10 glass capillary tube (about 1 mm in outer diameter and 1.2 μm in inner diameter; the glass having a refractive index with respect to a beam 820 nm in wavelength of 1.710). Subsequently, a fiber wavelength modulator device was obtained in the same manner as in Example 1.

EXAMPLE 8

The same procedure described in Example 2 was applied to a capillary tube used in Example 7 to obtain single crystal PRA inside the tube. Subsequently, a fiber wavelength modulator device was obtained in the same manner as in Example 1.

EXAMPLE 9

An end of an SF1 glass capillary tube (about 1 mm in outer diameter and 1.7 μm in inner diameter; the glass having a refractive index with respect to a beam 1064 nm in wavelength of 1.692) was immersed into a melt of 4(N,N-dimethylamino)-3-acetamidenitrobenzene (DAN; having a m.p. of 165° C.) maintained at 173° C. After the PRA melt was sufficiently sucked up into the tube by the capillary action, the tube was rapidly cooled to obtain polycrystalline precipitates of DAN inside the tube. The polycrystals were remelted by charging the tube into a heating furnace maintained at 170° C., and the tube was drawn out from one end of the heating furnace at the rate of 1 mm/hour to obtain a single crystal DAN grown inside the tube to about 50 mm in length.

A fiber wavelength modulator was then obtained in the same manner as in Example 1.

Figure 2:
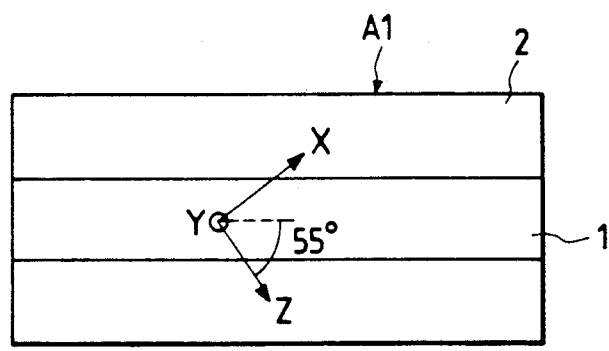
FIG. 2 is an explanatory figure for a wavelength modulator device, A1, according to the present invention.

The fiber wavelength modulator Al thus produced is shown in FIG. 2, comprising a core[1a] of the single crystal DAN. It can be seen that the single crystal DAN is tilted in such a manner that the Z-axis makes an angle of 55° from the major axis of the fiber. When a fundamental wave polarized along the Z-axis direction was introduced, it was found to successfully emit a second harmonic component polarized along the Y-axis direction.

EXAMPLE 10

An SF4 glass capillary tube (about 1 mm in outer diameter and 1.5 μm in inner diameter) was charged in a heating furnace maintained at 100° C., and inside this tube was injected an acetonitrile solution comprising 0.1 g/ml of 4,5-dimethyl-1,3-dithiol-2-ylidenecyanoacetate. The tube was then drawn out in the same manner as in Example 2, to effect crystal growth and obtain single crystals of 4,5-dimethyl-1,3-dithiol-2-ylidenecyanoacetate inside the tube.

The same procedure of Example 1 was repeated to obtain a fiber wavelength modulator device.

Figure 3:
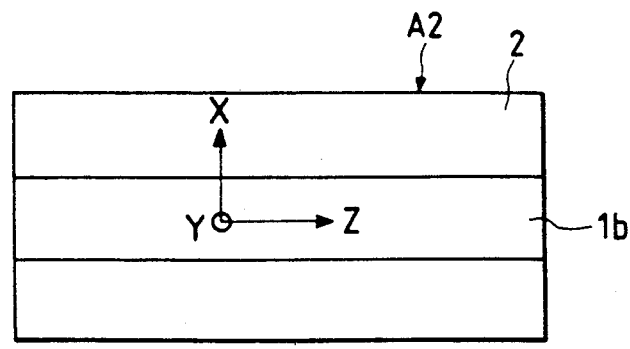
FIG. 3 is an explanatory figure for a wavelength modulator device, A2, according to the present invention.

As shown in FIG. 3, the wavelength modulator device A2 comprised a single crystal core[1b] having X and Y axes in the cross section of the core, and when an incident beam polarized along the X-axis direction entered, a secondary harmonic component polarized along the X-axis direction was emitted. The refraction index of this single crystal along the X-axis direction with respect to a beam 820 nm in wavelength was 1.77.

EXAMPLE 11

An end of an SF14 glass capillary tube (about 1 mm in outer diameter and 1.5 μm in inner diameter) was immersed into a melt of 3-(2-cyano-2-ethoxycarbonyl-vinyl)indole (having a m.p. of 170° C.) maintained at 175° C., and the same procedure of Example 1 was repeated to obtain polycrystals thereof inside the tube. The polycrystals were remelted by charging the tube into a heating furnace maintained at 175° C., and the tube was drawn out from one end of the heating furnace at the rate of 3 mm/hour to obtain a single crystal grown inside the tube to a length of about 50 mm.

A fiber wavelength modulator device was obtained in the same manner of Example 1.

The fiber modulator device comprised a single crystal core having the dielectric principal axis extended in the same direction as the direction of that of the single crystal obtained in Example 10. A second harmonic component polarized along the X-axis direction was emitted upon incidence of a fundamental beam polarized along the X-axis direction. The refraction index of this single crystal along the X-axis direction with respect to a beam 820 nm in wavelength was 1.79.

EXAMPLE 12

The same procedure as used in Example 1 was applied to a capillary tube used in Example 11 to charge therein 2-methyl-4-nitroaniline (having a m.p. of 130° C.) at 135° C., and precipitates of the polycrystals thereof were obtained inside the tube. The polycrystals were remelted by charging the tube into a heating furnace maintained at 135° C., and single crystals were grown therefrom by following the same procedure of Example 11. A fiber wavelength modulator device was obtained in the same manner as in Example 1.

The fiber modulator device comprised a single crystal core the dielectric principal axis of which extended in the same direction as the direction of that of the single crystal obtained in Example 10, and a second harmonic component polarized along the X-axis direction was emitted upon incidence of a fundamental beam polarized along the X-axis direction. The refraction index of this single crystal along the X-axis direction with respect to a beam 820 nm in wavelength was 1.80.

EXAMPLE 13

The same procedure as used in Example 1 was applied to a capillary tube used in Example 11 to charge therein 4'-nitrobenzylidene-3-acetamino-4-methoxyaniline (having a m.p. of 193° C.) at 198° C., and precipitates of the polycrystals thereof were obtained inside the tube. The polycrystals were remelted by charging the tube into a heating furnace maintained at 198° C., and single crystal were grown therefrom by following the same procedure of Example 11. A fiber wavelength modulator device was obtained in the same manner as in Example 1.

The fiber modulator device comprised a single crystal core having the dielectric principal axis extended in the same direction as the direction of that of the single crystal obtained in Example 10. A second harmonic component polarized along the X-axis direction, was emitted upon incidence of a fundamental beam polarized along the X-axis direction. The refraction index of this single crystal along the X-axis direction with respect to a beam 820 nm in wavelength was 1.82.

EXAMPLE 14

The same procedure as used in Example 2 was applied to the same capillary tube as employed in Example 11, to charge therein a methanol solution containing 0.3 g/ml of a molecular salt expressed by formula (I) below, comprising 4-(4'-hydroxystyryl)-1-methylpyridium as the cation and 4-toluenesulfonate as the anion, while maintaining the heating furnace at 80° C.

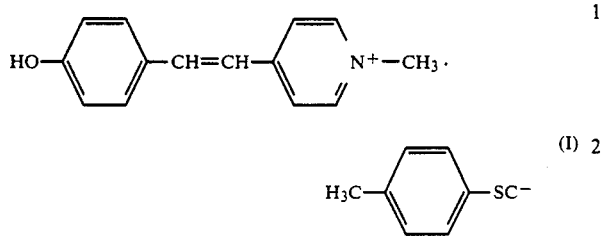

(I)

A single crystal of the molecular salt was grown inside the tube by slowly drawing the tube following the same process of Example 2.

A fiber wavelength modulator device was obtained in the same manner as in Example 1.

The fiber modulator device comprised a single crystal core having the dielectric principal axis extended in the same direction as the direction of that of the single crystal obtained in Example 10. A second harmonic component polarized along the X-axis direction was emitted upon incidence of a fundamental beam polarized along the X-axis direction. The refraction index of this single crystal along the X-axis direction with respect to a beam 820 nm in wavelength was 1.79.

EXAMPLE 15

The same procedure as described in Example 14 was repeated to obtain a fiber modulator device, except for using in the place of a slat expressed by (I), a molecular salt expressed by the formula (II) below which comprises 4-(4'-chlorostyryl)-1-methylpyridium as the cation and 4-toluenesulfonate as the anion.

The fiber modulator device comprised a single crystal core having the dielectric principal axis extended in the same direction as that of the single crystal obtained in Example 10. A second harmonic component polarized along the X-axis direction was emitted upon incidence of a fundamental beam polarized along the X-axis direction. The refraction index of this single crystal along the X-axis direction with respect to a beam 820 nm in wavelength was 1.79.

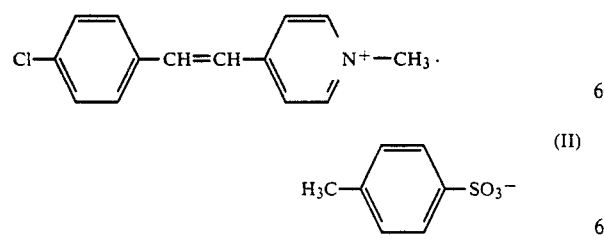

(II)

EXAMPLE 16

An end of an SF10 glass capillary tube (about 1 mm in outer diameter and 1.5 μm in inner diameter) was immersed into a melt of 4-bromo-4'-methoxycalcon (having a m.p. of 160° C.) maintained at 165° C. After the melt was sufficiently sucked up into the tube by the capillary action, the tube was rapidly cooled to obtain polycrystalline precipitates inside the tube in the same manner described in Example 1. The polycrystals were remelted by charging the tube into a heating furnace maintained at 165° C., and a single crystal was grown therefrom following the procedure described in Example 11.

A fiber wavelength modulator device was obtained in the same manner as in Example 1.

Figure 4:
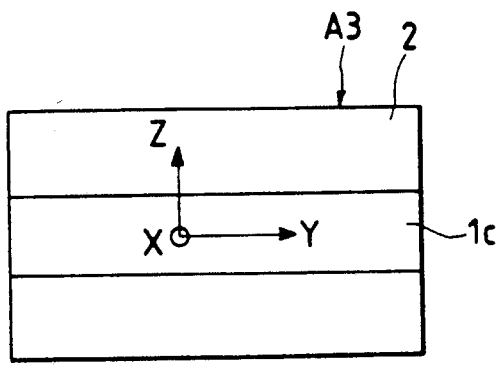
FIG. 4 is an explanatory figure for a wavelength modulator device, A3, according to the present invention.
Figure 5:
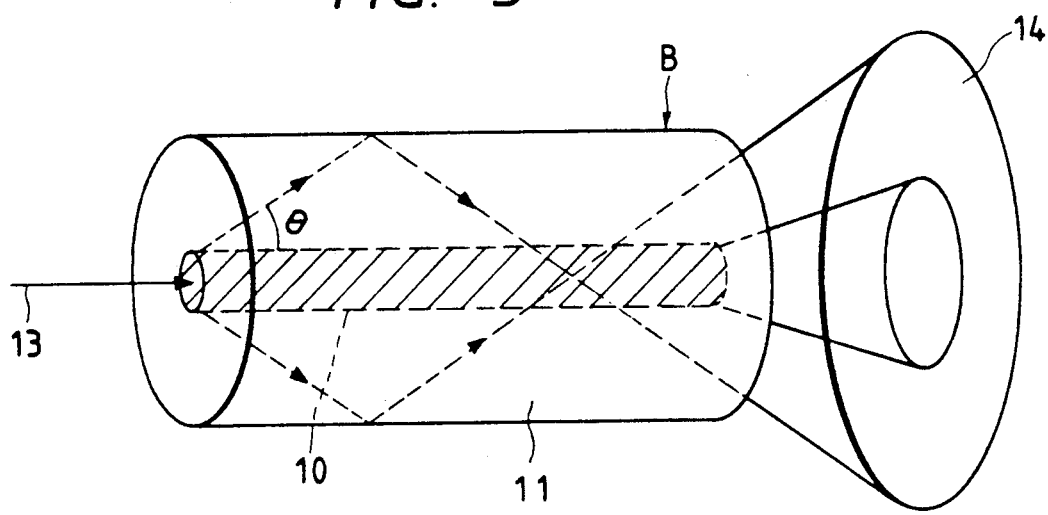
FIG. 5 is an oblique view of a modulator device according to the prior art.
Figure 6:
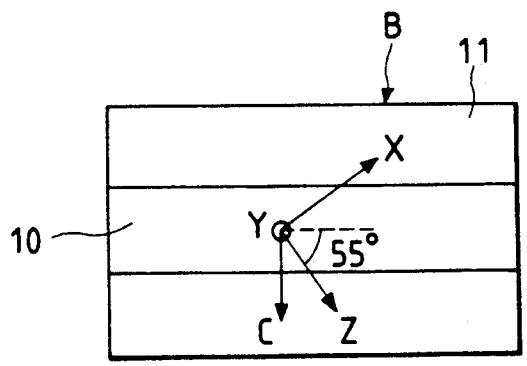
FIG. 6 explains a modulator device of the prior art.

The fiber modulator device A3 as shown in FIG. 4 comprised a single crystal core [1c] having dielectric principal axes X, Y, and Z, and a second harmonic component polarized along the X-axis direction was emitted upon incidence of a fundamental beam polarized along the Z-axis direction. The refraction index of this single crystal along the Z-axis direction with respect to a beam 820 nm in wavelength was 1.76.

COMPARATIVE EXAMPLE 1

The same procedure as in Example 9 was applied to a SF4 glass capillary tube having an outer diameter of 1 mm and an inner diameter of 2.5 μm, to obtain therein single crystal DAN.

Then a fiber wavelength modulator device was produced therefrom following the process described in Example 1.

COMPARABLE EXAMPLE 2

The same procedure as in Example 1 was applied to a SF11 glass (having a refractive index with respect to a beam 820 nm in wavelength of 1.763) capillary tube having an outer diameter of 1 mm and an inner diameter of 2.5 μm, to obtain therein single crystal PRA. Then, a fiber wavelength modulator device was produced therefrom following the process described in Example 1.

EVALUATION TESTS

At one end of each of the fiber wavelength modulator devices obtained in Examples 1 to 16 and Comparative Examples 1 and 2 a laser beam was applied to and entered each device. The intensity of the second harmonic component emitted from the other end of the device as well as the modulation efficiency were measured. A semiconductor laser emitting a beam 820 nm in wavelength was applied to the devices obtained in the Examples except for Example 9 and Comparative Example 2. In these cases, a Nd:YAG laser emitting a 1064-nm beam was applied to the devices obtained in Example 9 and Comparative Example 1. The incident beam intensity and the polarization of the laser beams are given in Table 1 with the test results.

From Table 1 it can be seen that the wavelength modulator devices obtained according to the present invention in Examples from 1 to 8 and from 10 to 16, having a relative difference between the core and the cladding in the refraction index of 0.015 or more with respect to the fundamental laser beam having a wavelength of 820 nm, show a higher modulation efficiency for each as compared with the modulator device having a relative difference in refraction index of less than 0.015, as exemplified by the device of the Comparative Example 2. Similarly, by comparing the modulator device manufactured in Example 9, having a relative difference in refraction index of 0.015 or more, with that obtained in Comparative Example 1, having a relative difference in refraction index of less than 0.015, it can be seen that the former gives a higher modulator efficiency upon incidence of a fundamental wave 1064 nm in wavelength emitted from an Nd:YAG laser.

The modulator device according to the present invention having a relative difference between the core and the cladding in refractive index of 0.025 or more can, as illustrated above, constantly maintain the power of the fundamental wave even when the core diameter is reduced, and can thereby increase the power density, $P\omega/a$, to modulate a fundamental wave to the secondary harmonic component at high efficiency.

TABLE 1

|         | (1)   | (2)  | (3) | (4) | (5)   | (6)   |
|---------|-------|------|-----|-----|-------|-------|
| Ex. 1   | 0.025 | 820  | 10  | Y   | 0.1   | 1     |
| Ex. 2   | 0.025 | 820  | 10  | Y   | 0.1   | 1     |
| Ex. 3   | 0.022 | 820  | 10  | Y   | 0.05  | 0.5   |
| Ex. 4   | 0.022 | 820  | 10  | Y   | 0.05  | 0.5   |
| Ex. 5   | 0.033 | 820  | 10  | Y   | 0.05  | 0.5   |
| Ex. 6   | 0.033 | 820  | 10  | Y   | 0.15  | 1.5   |
| Ex. 7   | 0.039 | 820  | 10  | Y   | 0.2   | 2.0   |
| Ex. 8   | 0.039 | 820  | 10  | Y   | 0.2   | 2.0   |
| Ex. 9   | 0.026 | 1064 | 100 | Z   | 0.1   | 0.1   |
| Ex. 10  | 0.019 | 820  | 10  | X   | 0.3   | 3.0   |
| Ex. 11  | 0.027 | 820  | 10  | X   | 0.3   | 3.0   |
| Ex. 12  | 0.033 | 820  | 10  | X   | 1.2   | 12    |
| Ex. 13  | 0.043 | 820  | 10  | X   | 2.0   | 20    |
| Ex. 14  | 0.027 | 820  | 10  | X   | 2.0   | 20    |
| Ex. 15  | 0.027 | 820  | 10  | X   | 2.0   | 20    |
| Ex. 16  | 0.028 | 820  | 10  | Z   | 0.05  | 0.5   |
| Comp. Ex 1 | 0.007 | 1064 | 100 | Z | 0.014 | 0.014 |
| Comp. Ex 2 | 0.010 | 820  | 10  | Y   | 0.01  | 0.1   |

(1) refractivity difference
(2) wavelength of the fundamental wave (nm)
(3) intensity of the fundamental wave (mW)
(4) polarization direction of the fundamental wave
(5) intensity of the modulated beam (mW)
(6) modulation efficiency (%)

While only a few exemplary embodiments of this invention have been described in detail, those skilled in the art will recognize that there are many possible variations and modifications which may be made in the exemplary embodiments while yet retaining many of the novel and advantageous features of this invention. Accordingly, it is intended that the following claims cover all such modifications and variations.

What is claimed is:

1. A fiber wavelength modulator device which emits a secondary harmonic component by Cerenkov radiation, comprising:
   a core being a single crystal of a non-linear optical material; and
   a cladding being composed of glass,
   wherein the relative difference between said core and said cladding has a refraction index with respect to an incident beam, of at least 0.015.

2. A wavelength modulator device as claimed in claim 1, wherein said single crystal comprises:
   an organic non-linear optical material selected from the group consisting of:
   (1) 3,5-dimethyl-1(4-nitrophenyl)pyrazole,
   (2) 4,5-dimethyl-1,3-dithiol-2-ylidenecyanoacetate,
   (3) 3-(2-cyano-2-ethoxycarbonylvinyl)indole,
   (4) 2-methyl-4-nitroaniline,
   (5) 4-(N,N-dimethylamino)-3-acetamidonitrobenzene,
   (6) 4'-nitrobenzylidene-3-acetamino-4-methoxyaniline,
   (7) a molecular salt comprising 4-(4'-hydroxystyryl)-1methylpyridium as the cation and 4-toluenesulfonate as the anion,
   (8) a molecular salt comprising 4-(4'-chlorostyryl)-1-methylpyridium as the cation and 4-toluenesulfonate as the anion, and
   (9) 4-bromo-4'-methoxycalcon.

3. A wavelength modulator device as claimed in claim 1 wherein said cladding glass is SF4 glass.

4. A wavelength modulator device as claimed in claim 1 wherein said single crystal is composed of 3,5-dimethyl-1-(4-nitrophenyl)pyrazol, and said cladding glass is SF4 glass.

* * * * *